United States Patent [19]

Vanasse

[11] 4,095,899
[45] Jun. 20, 1978

[54] APPARATUS FOR DOUBLE-BEAMING IN FOURIER SPECTROSCOPY

[75] Inventor: George A. Vanasse, Chelmsford, Mass.

[73] Assignee: The United States of America as represented by the Secretary of the Air Force, Washington, D.C.

[21] Appl. No.: 662,995

[22] Filed: Mar. 1, 1976

[51] Int. Cl.² .............................................. G01B 9/02
[52] U.S. Cl. ................................................ 356/106 S
[58] Field of Search .................................... 356/106 S

[56] References Cited

U.S. PATENT DOCUMENTS 3,897,154  7/1975  Hawes .............................. 356/106 S

OTHER PUBLICATIONS

"Double-beaming Technique in Fourier Spectroscopy," Vanasse et al.; Applied Optics; vol. 15, #2; Feb. 1976.

Primary Examiner—Vincent P. McGraw
Attorney, Agent, or Firm—Joseph E. Rusz; Jacob N. Erlich

[57] ABSTRACT

A technique for performing double-beaming in Fourier spectroscopy which is capable, in a single output, of measuring the spectra of desired radiation while suppressing the spectra of unwanted radiation. This technique is accomplished by feeding a pair of input beams on opposite faces of a beamsplitter at a preselected location thereon. In this manner radiation which is common to both input beams will be suppressed in the output interferogram.

1 Claim, 2 Drawing Figures

APPARATUS FOR DOUBLE-BEAMING IN FOURIER SPECTROSCOPY

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the field of spectroscopy, and, more particularly, to an improved technique of double-beaming in Fourier spectroscopy.

Spectroscopy is concerned with the production, measurement and interpretation of electromagnetic spectra arising from either emission or absorption of radiant energy by various substances. Emission spectra are produced when radiant energy from matter, excited by various forms of energy is passed through a slit and subsequently separated into its various components or wavelengths either by refraction in a transparent prism or by diffraction from a ruled grating or in a crystalline solid. The production of absorption spectra involves use of similar devices except that the excitation source is replaced by a suitable radiant energy source. Spectroscopic measurements of wavelengths and intensities of radiative energy are made using instruments called spectroscopes, spectrographs, spectrometers, or spectrophotometers.

Interpretation of the spectra provides information concerning atomic and molecular energy levels, electronic configurations of atoms and ions, molecular geometries, and chemical bonds. Empirical correlations of the spectral characteristics with chemical and physical properties of matter provide a basis for qualitative and quantitative chemical analysis.

The form of spectroscopy which has been found to be the most superior is that of Fourier spectroscopy. There are many reasons for this superiority, but the two most often referred to are the multiplex advantage and the aperture advantage. In addition, absolute wave number accuracy is guaranteed by the known wavelength used for carriage control, the physical apparatus is simple and both stray light and overlapping spectral orders are eliminated.

Unfortunately there are still a number of problems associated with Fourier spectroscopy. One of these is the dynamic range problem and another is the peculiar form of the raw data. It is not the spectrum which is measured, but rather a quantity called the interferogram, which is related to the spectrum by a Fourier transformation.

An attempt at the solution of the dynamic range problem is a double-beaming differencing interferometer. Such a system operates on the principle of looking alternatively at a reference and sample beam. However, all previous techniques of double-beaming consist of sequential measurements of short or large delays (between measurements) depending on the phenomenon being studied, and require either two detectors or a chopper which sends the two beams alternately on one detector. These drawbacks in double-beaming Fourier spectroscopy must be overcome for this technique to be readily accepted in the field of spectroscopy.

SUMMARY OF THE INVENTION

The double-beaming spectroscopy technique of the instant invention overcomes the problems set forth hereinabove by feeding the interferometer with two beams on opposite faces of a beamsplitter. With such a procedure the output which is common to both beams will be suppressed in the output interferogram; resulting in a measurement of only the desired or wanted radiation.

Heretofore, emission or absorption measurements required the use of two steps, and a post-subtraction technique used on the two sequential measurements. In addition, it was necessary to utilize either two detectors or a chopper which sends the two beams alternately on one detector. As a result thereof, when the two measurements consist of large values, the subtraction approach yields appreciable error.

The double-beaming techniques of the instant invention utilizes a beamsplitter which receives the two input beams on opposite faces thereof. With such a technique the output obtained is the sum of three interferograms. For example, in the case of obtaining $CO_2$ emission at elevated temperatures, the $CO_2$ is placed in a "hot cell". A blackbody emission made to match that of the "hot cell" alone is created by adjusting the temperature of the blackbody. The resultant sum of the three interferograms is made up of the interferogram of the blackbody emission, emission of the cell itself and the wanted $CO_2$ emission. The blackbody and cell interferograms are out of phase with each other and yield a constant value, while the third interferogram has structure due only to the $CO_2$ emission. In essence, the instant invention provides "real time" double-beaming in contrary to the "sequential" double-beaming of the past. It is therefore an object of this invention to provide a technique for double-beaming in Fourier spectroscopy which allows double-beaming using only one detector and no chopper.

It is another object of this invention to provide a technique for double-beaming in Fourier spectroscopy which greatly reduces the dynamic range problem heretofore encountered in Fourier spectroscopy.

It is a further object of this invention to provide a technique for double-beaming in Fourier spectroscopy which yields an interferogram having information only about the wanted radiation and none about the unwanted radiation.

It is still another object of this invention to provide a technique for double-beaming in Fourier spectroscopy which permits less radiation from falling upon the detector and, therefore, less likelihood of saturating the detector.

It is a still further object of this invention to provide a technique for double-beaming in Fourier spectroscopy which is economical to produce and which utilizes conventional, currently available components that lend themselves to standard mass producing manufacturing techniques.

For a better understanding of the present invention together with other and further objects thereof reference is made to the following description taken in conjunction with the accompanying drawing and its scope will be pointed out in the appended claims.

DETAILED DESCRIPTION OF THE PREFERRED EMBODIMENT

Figure 1:
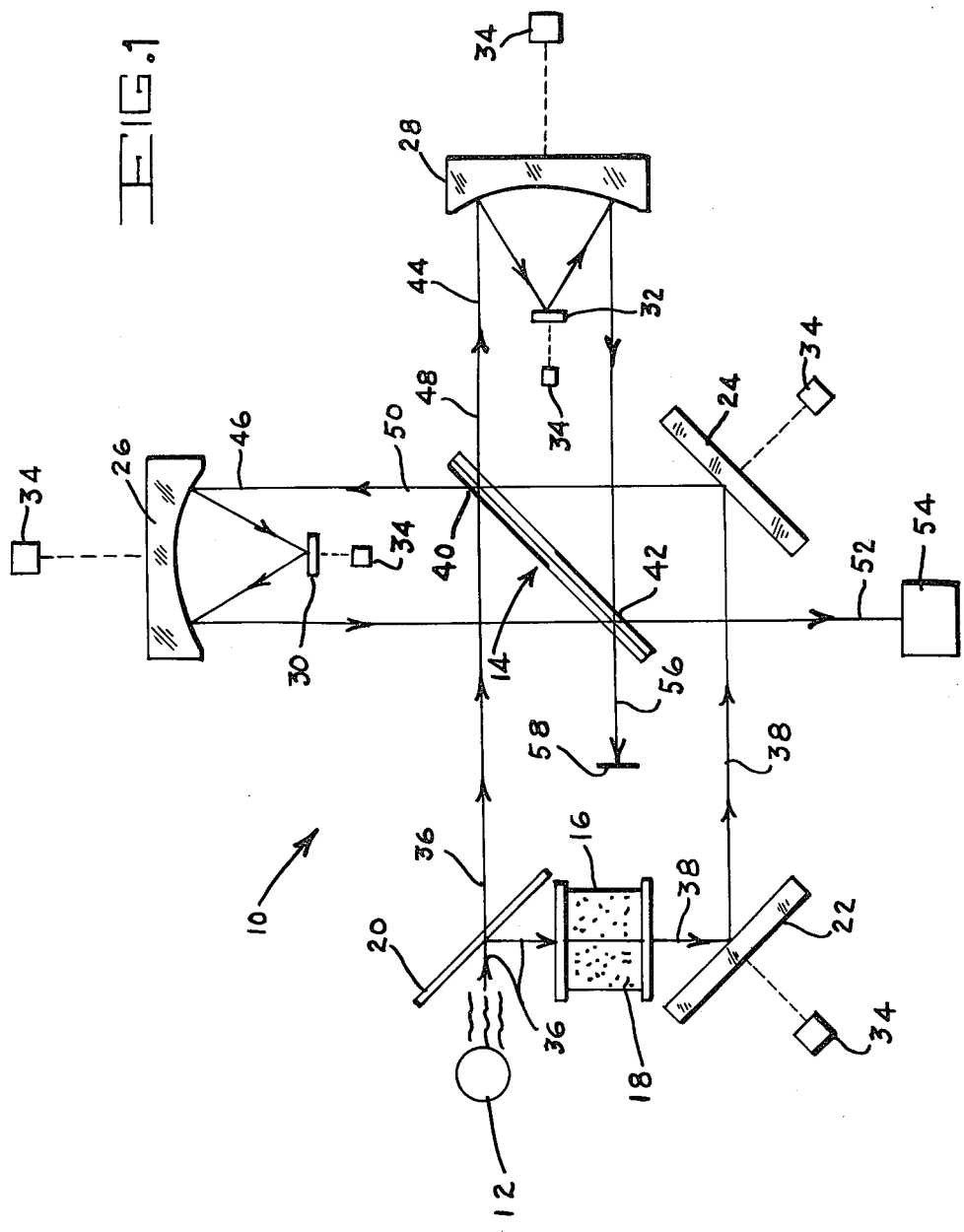
FIG. 1 is a schematic representation of the preferred embodiment of the apparatus of this invention for performing double-beaming in Fourier spectroscopy.

Reference is now made to FIG. 1 of the drawing which illustrates the preferred apparatus 10 of this invention utilized in the technique of double-beaming in Fourier spectroscopy. Apparatus 10 uses any suitable source of radiation such as an incandescent lamp 12 in optical alignment with a conventional dielectric beamsplitter 14 and a cell 16 containing a gas 18 under study. Any suitable optical directing means such as beamsplitter 20 is maintained in optical alignment with source 12 for focusing the radiation 36 from source 12 on beamsplitter 14 in the form of beam 36 and through cell 18 emanating in the form of beam 38.

In addition to beamsplitters 14 and 20, apparatus 10 incorporates therein a plurality of reflecting means such as mirrors 22, 24, 26, 30 and 32. Mirrors 22, 24, 26 28, 30 and 32 are capable of being adjusted to the proper position by any suitable adjusting means such as a manual or motor operated gear drive 34 shown schematically in the drawing. It is essential that mirrors 22, 24, 26, 28, 30 and 32 be positioned in optical alignment with beams 36 and 38 so that beams 36 and 38 intersect or cross at points 40 and 42 of beamsplitter 14.

In operation beam 36 from source 12 strikes beamsplitter 14 at 40 and is split into two beams 44 and 46. Beam 44 passes onto mirrors 28, 32 and back to beamsplitter 14 at 42 while beam 46 passes onto mirrors 26, 30 and the opposite face of beamsplitter 14 at 42.

Base 38 from source 12 after passing through gas 18 strikes mirrors 22 and 24. From mirror 24 beam 38 strikes the opposite face of beamsplitter 14 at 40 and splits into beams 48 and 50. Beams 48 and 50 follow the same optical paths of beams 44 and 46, respectively, intersecting beamsplitter 14 at 42.

In the embodiment of FIG. 1 beam 36 is radiation which has a spectrum corresponding to the spectrum of source 12, while beam 38 is radiation with a spectrum of source 12 minus the radiation absorbed by gas 18 within cell 16. Beams 36 and 38 recombine at point 42 of beamsplitter 14 yielding out-of-phase interferograms for source 12 which suppress each other to a constant and the output 52 has the form of an interferogram having structure due only to the absorptance of gas 18 within cell 16. Output 52 is detected by any conventional detector 54 which depends upon the spectral region of interest such as a PbS detector. Any other output 56 from beamsplitter 14 may be removed by a conventional absorber 58 or directed to a second detector, if so desired.

Although there are a multitude of different optical configurations of this invention the essence of the instant technique utilizes two beams on opposite faces of beamsplitter 14. This assures that at output 52, that output which is common to both beams 36 and 38 (source 12) will be suppressed in the output interferogram.

Figure 2:
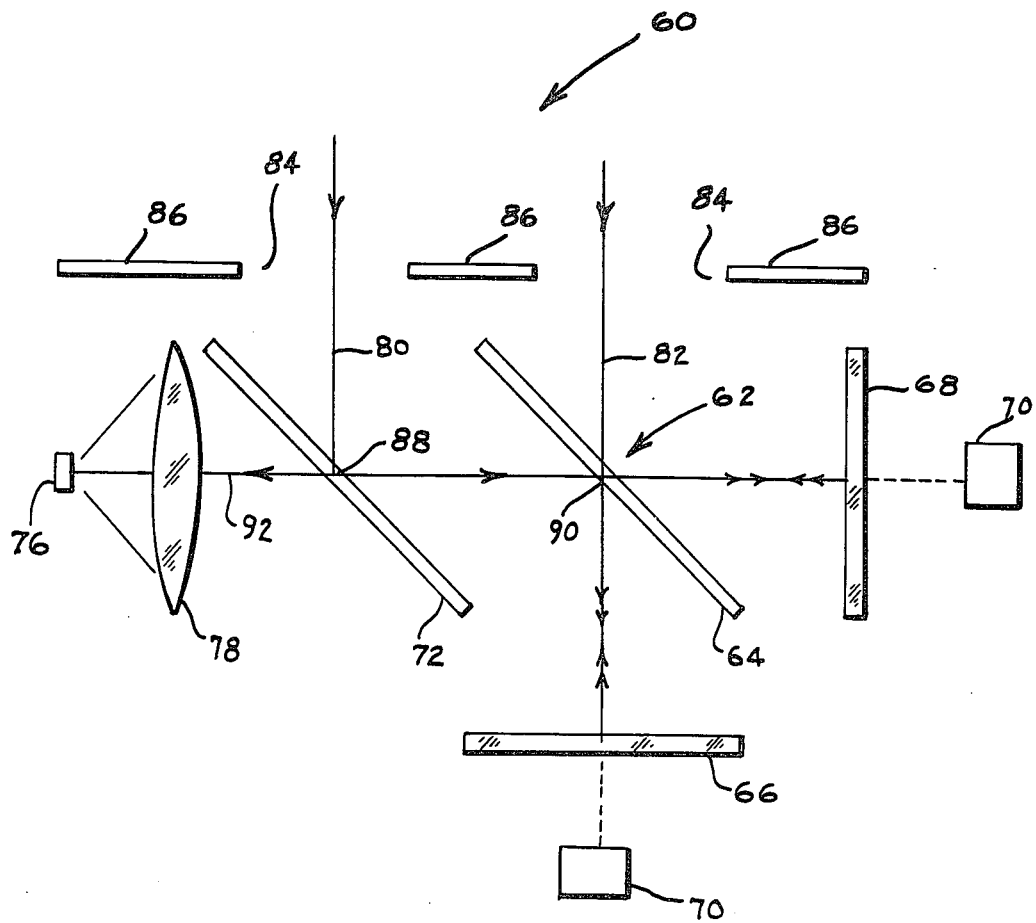
FIG. 2 is a schematic representation of another embodiment of the apparatus of this invention for performing double-beaming in Fourier spectroscopy.

Another embodiment of the instant invention is best shown by apparatus 60 in FIG. 2 of the drawing. Apparatus 60 incorporates therein a Michelson interferometer 62 made up of beamsplitter 64 and adjustable reflectors in the form of mirrors 66 and 68. Mirrors 66 and 68 are adjusted by any conventional gear train adjusting drive 70, shown in schematic fashion in FIG. 2.

A second beamsplitter 72 is optically aligned with beamsplitter 64, any suitable detector 76 and a focusing lens 78 (if necessary). A pair of inputs 80 and 82 pass through apertures 84 in plate 86 and strike beamsplitters 72 and 64, respectively at 88 and 90. As with apparatus 10 of FIG. 1, it is essential in this invention that beamsplitters 72 and 64 and mirrors 66 and 68 be so arranged that beams 80 and 82 intersect at points 88 and 90 on beamsplitters 72 and 64, respectively. As shown in the drawing input beam 80 after striking beamsplitter 88 is directed to the backside or opposite face of beamsplitter 64 thereby joining input 82 at 90.

The embodiment shown in FIG. 2 could be utilized as a simple pollution detector or monitor. For example, an input beam 82 could consist of radiation from an effluent (stack, automobile, etc.) being studied after passing through an intervening medium. Beam 80 could consist of radiation from an adjacent field of view which does not contain the effluent. The resultant interferogram produced at the output 92 contains structure due only to the effluent being studied. Apparatus 60 would also find applicability in astronomy. In this case beam 82 would contain a star (or planet) radiation plus intervening atmosphere, while beam 80 would be radiation from an adjacent field of view not including the star (or planet). Output interferogram 92 would yield spectral information only about the desired star (or planet).

Although this invention has been described with reference to particular embodiments it should be understood to those skilled in the art that this invention is also capable of a variety of further embodiments within the spirit and scope of the appended claims. For example, in measuring optical constants of materials, the cell 16 of FIG. 1 can be replaced by a plane parallel slab of material. The resulting interferogram would have structure due to the channelled spectrum only corresponding to the index of refraction and absorption coefficient of the slab of material.

I claim:

1. An apparatus for performing double-beaming in Fourier spectroscopy comprising a single source of radiant energy for producing a beam of radiation, means in optical alignment with said beam of radiation for splitting said beam emanating from said source into a first and a second input beam, a cell being in optical alignment with said second input beam, said cell having a gas located therein, said second input beam passing through said cell, said first input beam having a spectrum corresponding to the spectrum of said source while said second beam emanating from said cell has a spectrum corresponding to the spectrum of said source minus the spectrum of the radiation absorbed by said gas within said cell, a beamsplitter in optical alignment with said first and second input beams, said first input beam striking said beamsplitter on a preselected location on one face thereof, said second input beam striking said beamsplitter on said preselected location on a face of said beamsplitter opposite said one face, a plurality of mirror assemblies in optical alignment with said first and second input beams and said beamsplitter for causing said first and second input beams to intersect each other at another location on said beamsplitter resulting in an output beam therefrom, said other location on said beamsplitter being spaced apart a distance from said preselected location sufficient to prevent overlapping of said first and second input beams at said preselected location with said output beam, at least one of said plurality of mirror assemblies being made up of a pair of optically aligned and opposed mirrors wherein said input beams which are incident on and reflected from said mirror assembly are substantially parallel to each other and are substantially "on-axis" and means for detecting said output beam emanating from said beamsplitter, said output beam being in the form of an interferogram having structure due only to said spectrum of radiation absorbed by said gas.

* * * * *